United States Patent
Deveau

(10) Patent No.: US 6,525,990 B2
(45) Date of Patent: Feb. 25, 2003

(54) TARGET SIMULATION SYSTEM AND METHOD

(75) Inventor: David M. Deveau, West Palm Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/793,782

(22) Filed: Feb. 27, 2001

(65) Prior Publication Data

US 2002/0118599 A1 Aug. 29, 2002

(51) Int. Cl.[7] ............................................. H04B 17/00
(52) U.S. Cl. ......................................................... 367/13
(58) Field of Search ............................. 367/1, 13, 131, 367/2; 434/6–10

(56) References Cited

U.S. PATENT DOCUMENTS 5,122,989 A * 6/1992 Pirie et al. ...................... 367/2

\* cited by examiner

*Primary Examiner*—Daniel T. Pihulic
(74) *Attorney, Agent, or Firm*—James M. Kasischke; Michael F. Oglo; Jean-Paul Nasser

(57) ABSTRACT

A controlled simulation of an underwater target for testing and evaluating a sonar system. The target simulation system receives an acoustic test signal and generates a simulated reflected signal emulating the test signal reflected from a target of known target strength. The system includes hydrophones and projectors located underwater and a signal processing system located out of the water. The signal processing system detects the test signal received by the hydrophone and converts the test signal to digital format. A computer modulates or weights the digital signal using a target strength value representing the target strength to produce a digital representation of a simulated reflected signal. This simulated reflected signal is converted to an analog format and is retransmitted as a simulated reflected acoustic signal using the projector. The level of the simulated reflected acoustic signal can be increased or decreased to simulate various sizes of the same target.

16 Claims, 3 Drawing Sheets

TARGET SIMULATION SYSTEM AND METHOD

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to testing of sonar systems and more particularly, to a system and method for controlled simulation of a target underwater to test and evaluate a sonar system.

(2) Description of the Prior Art

Sonar systems transmit and receive underwater acoustic signals to locate targets such as underwater mines. A typical sonar system 10, FIG. 1, detects and locates a target 12 by transmitting an acoustic signal or ping 14. This acoustic signal 14 generated by the sonar system 10 is received by the target 12 and reflects back to the sonar system 10 as a reflected acoustic signal 16. In the reflected acoustic signal 16, the signal strength and wave structure is altered by the material characteristics of the target 12, i.e., the target vibrates and alters the shape of the reflected acoustic signal 16. The reflected acoustic signal 16 is received by the sonar system 10, and the sonar system 10 is able to determine distance information based upon the reflected acoustic signal 16.

One application of a sonar system is to locate and map mines underwater. Mine hunting systems and other underwater communications systems that transmit and receive underwater acoustic signals must be tested to measure the performance of these systems. One technique for testing these systems involves simulating an underwater target and determining whether or not the system can detect and locate the simulated target. Since there is little known about the acoustic properties of the target being detected, a sonar system is typically declared a success as long as it gets a reasonable response. If an underwater target cannot be detected, however, the evaluator may not know whether or not the failure lies with the test target or with the system being tested. For developers of sonar systems, a controlled test target is important to know if the system functions properly. Existing test systems acoustically reply back when interrogated by a sonar ping, but the reply has no characteristic of the original sonar signal nor is the reply a characteristic acoustic signature of a given underwater body. Underwater evaluation systems must provide a method of scoring and constructive feedback to the systems that are being tested.

SUMMARY OF THE INVENTION

Accordingly, one object of the present invention is to provide sonar systems with the capability of receiving a controlled response from an underwater target in order to gauge performance of the system.

Another object of the present invention is to provide a simulation system that can also act as a scoring system to maintain a record of hits and allow further systems evaluation.

The present invention features a target simulation system comprising a hydrophone for receiving an original acoustic test signal and converting the acoustic test signal to an analog electrical test signal. The signal processing system receives the analog electrical test signal, converts the analog electrical test signal to a digital test signal, modifies the digital test signal to form a simulated reflected signal emulating the original acoustic test signal reflecting from a target having a known target strength, and converts the simulated reflected signal to analog format. The projector receives the simulated reflected signal in analog format and converts the simulated reflected signal to a simulated reflected acoustic signal.

According to one preferred embodiment, the signal processing system includes an A/D converter for converting the analog electrical test signal to the digital test signal. A computer system is coupled to the A/D converter for modifying the digital test signal to form the simulated reflected signal emulating the original acoustic test signal reflecting from the target having a known target strength. A D/A converter is coupled to the computer system for converting the simulated reflected signal to analog format. The computer system can include a computer program for adding a target strength value to values of the digital test signal to form the simulated reflected signal. The computer system can also include a digital buffer for buffering the simulated reflected signal.

In one embodiment, the signal processing system further includes a signal detector coupled between the hydrophone and the A/D converter for detecting the analog electrical test signal and excluding other signals from detection. In one embodiment, the signal processing system can also include a power amplifier coupled between the projector and the D/A converter for amplifying the simulated reflected signal in analog format.

The present invention also features a method of generating a target simulation signal. The method comprises transmitting an acoustic test signal underwater. The acoustic test signal is received and converted to an analog electrical test signal. The analog electrical test signal is digitized to produce a digital test signal. The digital test signal is then modified to form a simulated reflected signal emulating the acoustic test signal reflected from a target having a known target strength. The simulated reflected signal is converted to analog format, is transmitted underwater, and is received underwater.

According to one method, the step of modifying the digital test signal includes converting the digital test signal into a series of ASCII numbers; receiving a target strength value; adding the target strength value to each of the ASCII numbers representing the digital test signal to produce an ASCII representation of the simulated reflected signal; and converting the ASCII representation of the simulated reflected signal.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
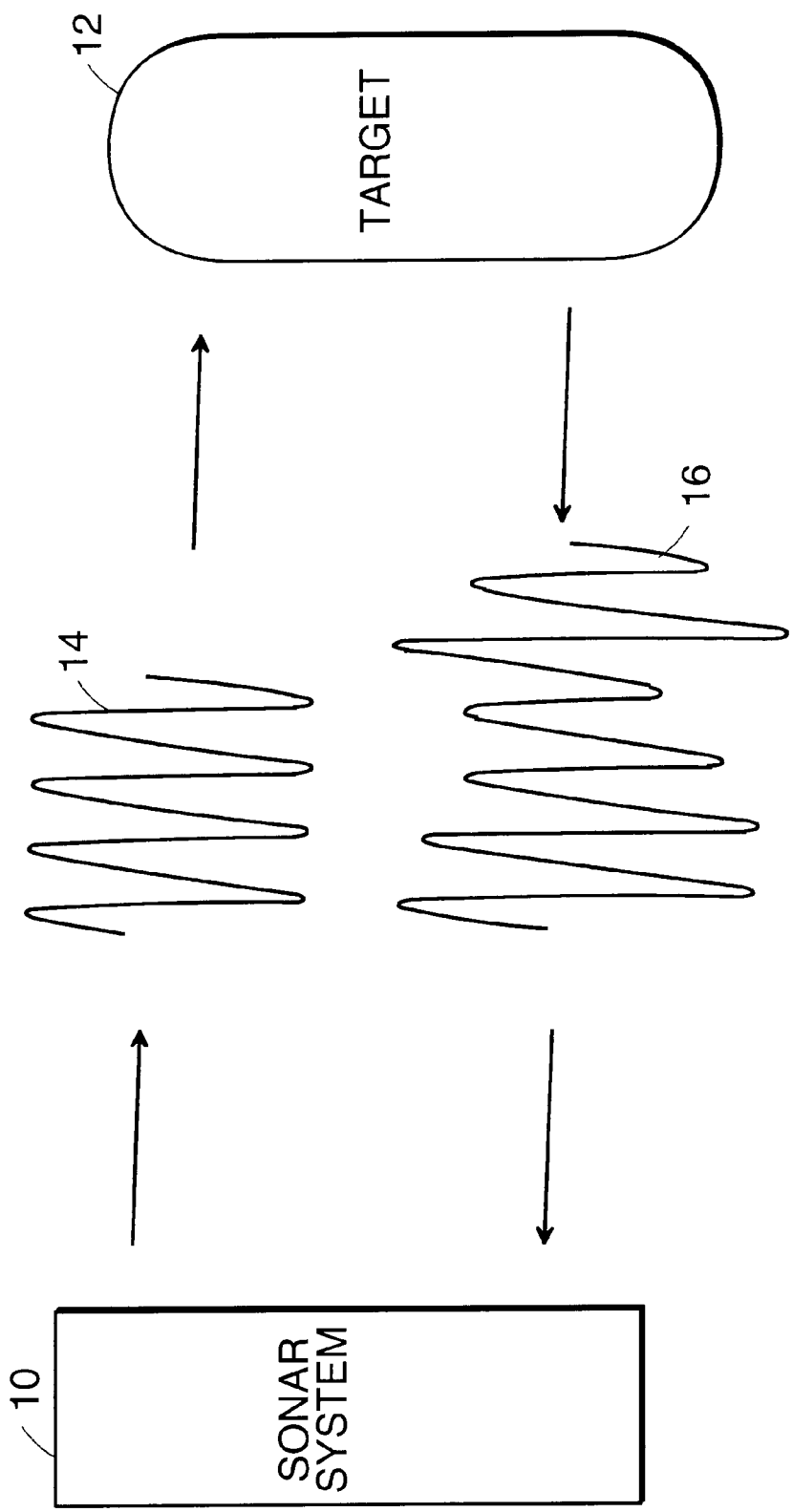
FIG. 1 is a schematic illustration of the operation of a sonar system, according to the prior art.
Figure 2:
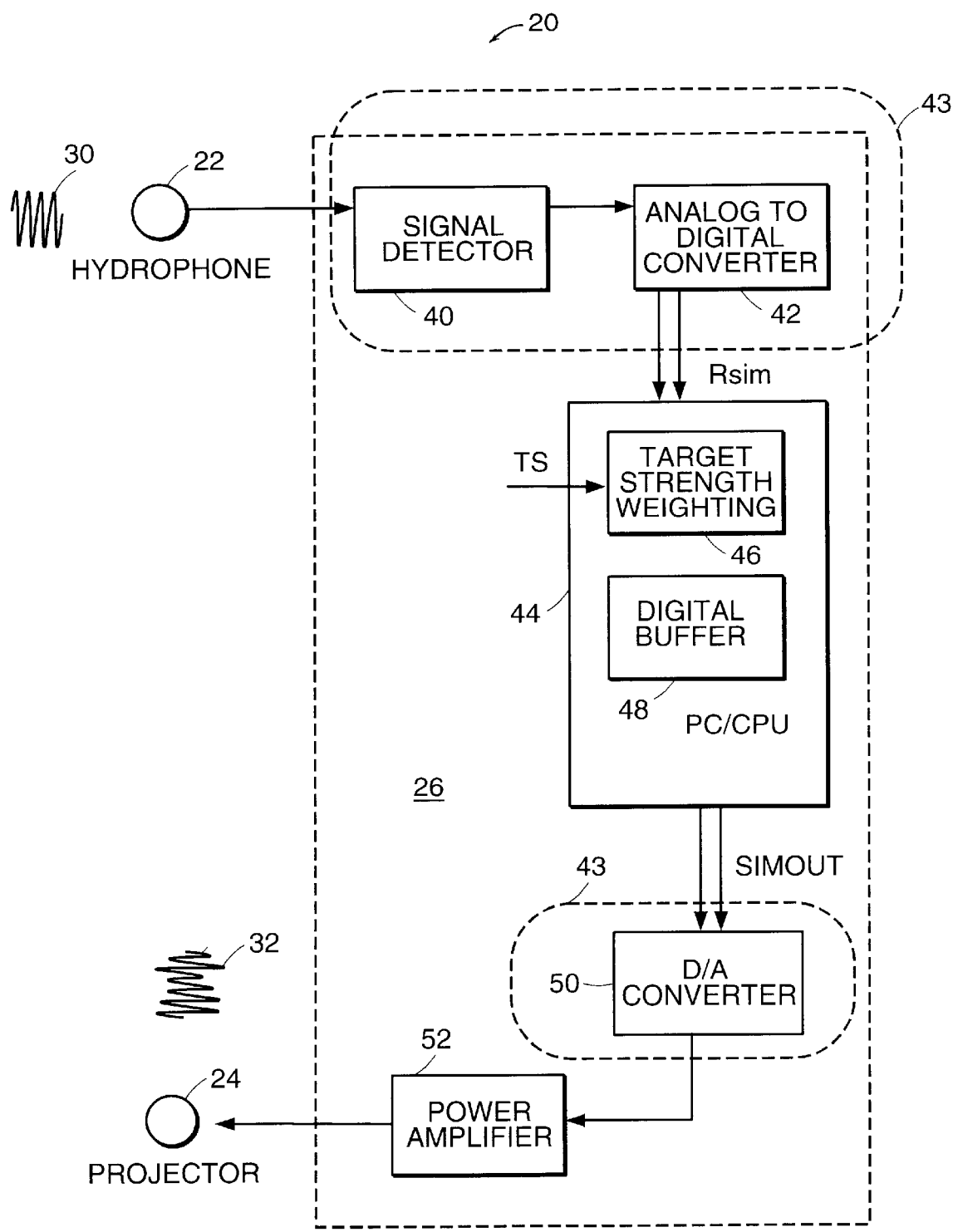
FIG. 2 is a schematic block diagram of a target simulation system, according to the present invention.
Figure 3:
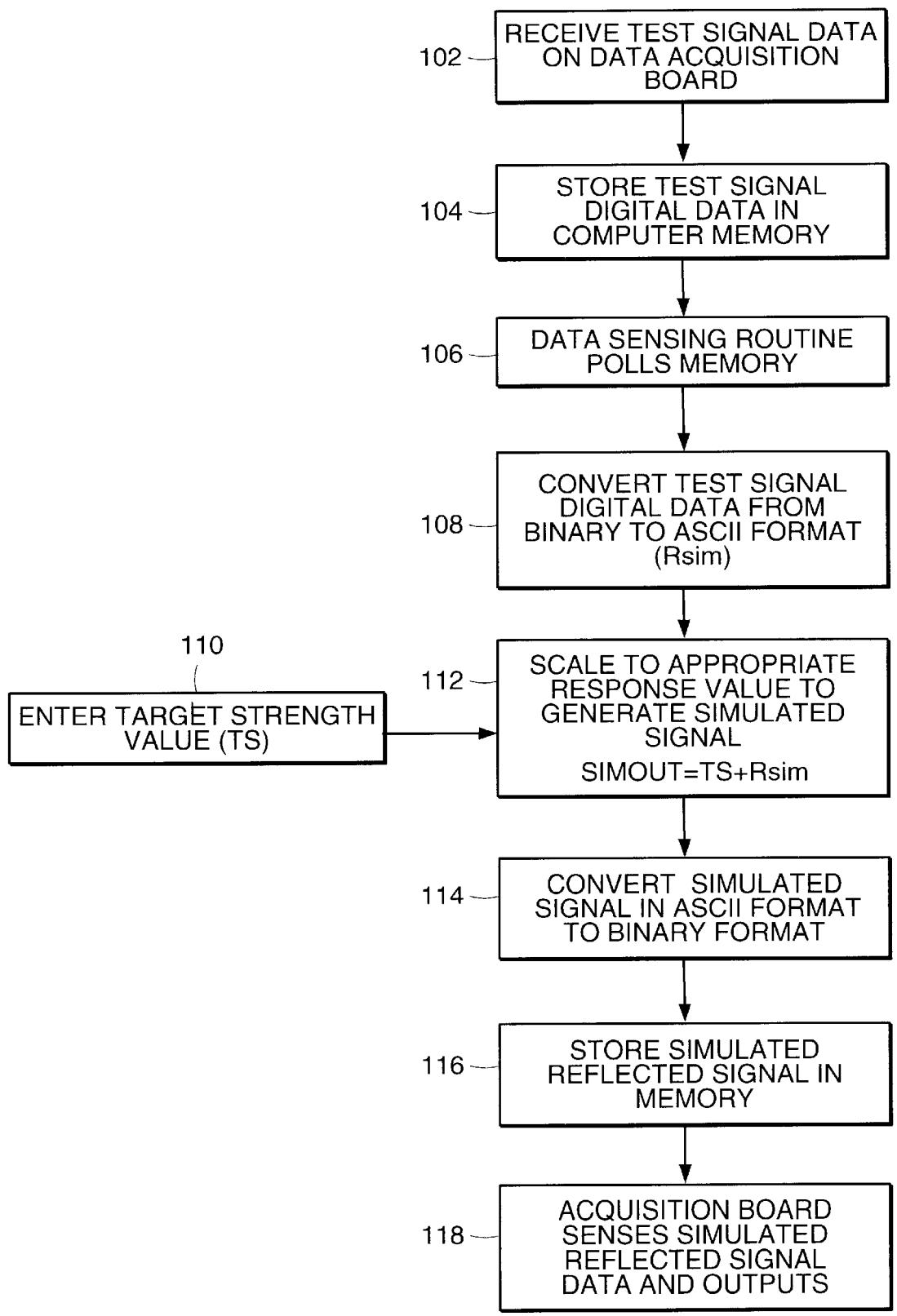
FIG. 3 is a flow chart illustrating a method of generating a target simulation signal.

The target simulation system 20, FIG. 2, according to the present invention, is used to simulate the reflected acoustic signal 16 reflecting from a target 12 (see FIG. 1). The target simulation system 20 can be used with a sonar system 10, such as a mine hunting system, or any other underwater communication system where active feedback is required. By simulating a target 12 having a known target strength, the target simulation system 20 provides controlled testing and evaluation of the sonar system being tested.

The target simulation system 20 includes one or more underwater microphones or hydrophones 22 and one or more speakers or projectors 24. A test signal processing system 26 is coupled to each hydrophone 22 and projector 24, preferably using an underwater electrical cable. The hydrophone(s) 22 and projector(s) 24 are preferably located underwater on the ocean bottom while the signal processing system 26 is located outside of the water, for example, on a support vessel. Thus, the target simulation system 20 includes minimal in-water hardware to allow for maximum flexibility to the operator and the test personnel.

The hydrophone 22 receives an original acoustic test signal 30, such as the sonar signal 14 transmitted by the sonar system 10 (see FIG. 1). The hydrophone 22 converts the acoustic test signal 30 into an electrical test signal, which travels to components in signal processing system 26. The signal processing system 26 includes an analog to digital computer which converts the analog electrical test signal to a digital test signal, and the remaining components of system 36 modify the digital test signal to form a simulated reflected signal emulating the original acoustic test signal reflecting from a target having a known target strength, and converts the simulated reflected signal to analog format. The projector 24 converts the simulated reflected signal in analog format to a simulated reflected acoustic signal 32. The simulated reflected acoustic signal 32 simulates the reflected acoustic signal 16 that is reflected from an actual target 12 having the known target strength (see FIG. 1). The acoustic signal 30 is generated by any sonar system under test (not shown) which is capable of generating a controlled underwater sound signal. The simulated reflected acoustic signal 32 is transmitted back to the sonar system under test and is received and analyzed.

According to one embodiment, the signal processing system 26 includes a signal detector 40, such as a signal detection circuit, which monitors the underwater environment and prevents any signal from entering the signal processing system 26 unless it meets a set of criteria, such as possessing a certain signal strength or frequency. Detecting only the test signal and excluding these other signals from detection will prevent the projector 24 from running continuously when transmitting the simulated reflected signal. Once the appropriate signal is detected, an A/D converter 42, such as an analog to digital conversion circuit, converts the signal into a digital data format that can be processed by a computer system. The A/D converter 42 operates using an internal digital clock that samples the signal at a rate such that the digital test signal captures all of the variations of its analog equivalent. Preferably, the sampling rate is set to approximately three times the highest frequency that will be emitted by the sonar system being tested. Signal detector 40, A/D converter 42, and D/A converter 50 are present on a common data acquisition board 43, shown in two parts on FIG. 2.

The signal processing system 26 further includes a computer system 44, such as a PC, that modulates the digital test signal to emulate being reflected off of a physical target. The computer system 44 preferably includes a computer program 46 that weights or digitally filters the digital test signal using a target strength value (TS) representing the target strength of the physical target being simulated. The shape of the digital signal is thereby altered according to the target strength value. The computer system 44 in performing these functions effectively forms a digital buffer 48 that buffers the digital data stream representing the simulated reflected signal. The digital buffer 48 stores or holds the digital data stream until the entire signal is captured. This allows the simulation system 20 to duplicate the effect of an acoustic signal reflecting off of the target body.

A D/A converter 50 receives the buffered digital data representing the simulated reflected signal and converts the digital data to a simulated reflected signal in analog format. The analog simulated reflected signal is fed to a power amplifier 52, which increases the signal's voltage level such that the signal excites the underwater transducer within the projector 24 and produces the simulated reflected acoustic signal 32. The simulated acoustic reflected signal 32 is the acoustical equivalent of the original acoustic test signal 30, attenuated by the target strength of the physical target being simulated. The target simulation system 20 thus replies to a test signal with a simulated reflected signal containing the same characteristics of the original test signal.

The change in the strength of a reflected acoustic signal 16, as shown in FIG. 1, is directly related to the target strength of the target 12. The target strength value (TS) used for weighting the digital test signal to produce the simulated reflected signal is a constant representing the target strength of the target or physical item being simulated. The target strength of each physical body varies with the body shape, material, interior components, and the signal frequency of the sonar system 10. The target strength can be mathematically related to the output level of the sonar system 10 and the level that it receives back, corrected for losses due to propagation. The general target strength (TS) is a function of the source level (SRC) of the sonar signal 14, receive level (RCVR) of the received reflected acoustic signal 16, and range (R) or distance in which the signal traveled, as indicated by the following equation:

$$TS=RCVR-SRC+40*Log(R) \tag{1}$$

The target simulation system 20 of the present invention attenuates the acoustic test signal 30 such that it satisfies Equation (1) on the sonar system 10. The level received by the simulation system 20 (Rsim) can be related to the source level (SRC) transmitted by the sonar system 10 by knowing the physical distance between the sonar system 10 and the simulation system 20 (Rtgt). This relationship is shown as follows:

$$SRC=Rsim+20*Log(Rtgt) \tag{2}$$

The signal level received back at the sonar system (RCVR) can be equated to the level generated by the simulation system 20 (SIMOUT) by knowing the physical distance between the sonar system 10 and the simulation system 20 (Rtgt) as follows:

$$RCVR=SIMOUT-20*Log(Rtgt) \tag{3}$$

Substituting Equation (2) and Equation (3) into Equation (1) yields:

$$TS=SIMOUT-Rsim \tag{4}$$

Equation 4 directly relates the acoustic signal level (Rsim) received by the simulation system 20 and the level (SIMOUT) the simulation system 20 needs to produce to satisfy Equation 1 at the sonar system 10. Thus, it is not necessary to know the physical distance between the sonar system 10 and the simulation system 20. The simulation system 20 only needs the value of the target strength (TS).

According to the present invention, a fixed value of target strength is assumed to simulate a general class of mines. Various mathematical equations can be used to provide the target strength for physical shapes such as spheres and cylinders, and in general these values provide a rough equivalence to an underwater body of similar characteristics. The target strength value (TS) used in the present invention is a constant and does not take into account variances due to multifrequency sonar signals, nor the structural characteristics of the simulated target, both of which will contribute to variations in the target strength. Thus, the simulation system of the present invention provides an acoustical feedback that indicates a detection has been achieved and determines if the sonar system being tested has acoustically insonified the simulated target without requiring complex computer modeling.

According to one method of generating a simulated reflected signal, analog electrical test signals are acquired and digitized by a data acquisition board, step 102. The test signal digital data is then placed automatically into a preprogrammed location in memory, step 104. A data sensing routine running on the computer system 44 polls this location in memory to determine when data has been stored to this location, step 106.

The digital data representing the test signal is then converted from its binary representation to its ASCII equivalent and converted to its proper mathematically scaled value based on the data range of the data acquisition board, step 108. The computer program used to apply the target strength weighting to the data set representing the received test signal (Rsim) is a simple loop with a mathematical scaling routine. The operator enters a target strength value (TS), step 110, and the values of the digital test signal (Rsim) are added to the target strength value (TS) to produce an ASCII representation of the simulated reflected signal (SIMOUT), step 112. The ASCII representation of the simulated reflected signal is then converted to binary format, step 114. The binary representation of the simulated reflected signal is then sent to a predefined section of computer memory, step 116, where the data acquisition board senses the data and outputs the signal to the remaining system hardware, step 118.

The level of the simulated reflected signal can be increased or decreased to simulate various sizes of the same target. By varying the response level, the simulation system allows the sonar operators to gauge their performance and determine sensitivity to the environment's acoustics. The target simulation system can also be used as a scoring system to determine how well the sonar platform is able to insonify the mine or target area.

In light of the above, it is therefore understood that within the scope of the appended claims, the invention may be practiced otherwise than as specifically described.

What is claimed is:

1. A target simulation system comprising:
   a hydrophone for receiving an original acoustic test signal and converting said original acoustic test signal to an analog electrical test signal;
   a signal processing system wherein:
      an A/D converter for converting said analog electrical test signal to a digital test signal,
      a computer system coupled to said A/D converter for modifying said digital test signal to form a simulated reflected signal emulating said original acoustic test signal reflecting from a target having a known target strength, said computer system including a computer program for adding a target strength value to values of said digital test signal to form said simulated reflected signal, and
      a D/A converter coupled to said computer system for converting said simulated reflected signal to analog format; and
   a projector for receiving said simulated reflected signal in analog format and for converting said simulated reflected signal in analog format to a simulated reflected acoustic signal.

2. The target simulation system of claim 1 wherein said signal processing system further includes:
   a power amplifier coupled between said projector and said D/A converter for amplifying said simulated reflected signal in analog format.

3. The target simulation system of claim 1 wherein said computer system includes means for weighting said digital test signal using a target strength value to form said simulated reflected signal.

4. The target simulation system of claim 2 wherein said computer includes a digital buffer for buffering said simulated reflected signal.

5. The target simulation system of claim 1 wherein said computer system includes a digital filter for weighting said digital test signal using a target strength value to form said simulated reflected signal.

6. The target simulation system of claim 1 wherein said signal processing system includes means for weighting said digital test signal using a target strength value to form said simulated reflected signal.

7. The target simulation system of claim 1 wherein said signal processing system further includes:
   a signal detector coupled between said hydrophone and said A/D converter for detecting said analog electrical test signal and excluding other signals from detection.

8. A target simulation system comprising:
   a hydrophone for receiving an original acoustic test signal and converting said original acoustic test signal to an analog electrical test signal;
   an A/D converter coupled to said hydrophone for converting said analog electrical test signal to a digital test signal;
   a computer coupled to said A/D converter for modifying said digital test signal to form a simulated reflected signal emulating said original acoustic test signal reflecting from a target having a known target strength, said computer including a computer program for adding a target strength value to values of said digital test signal to form said simulated reflected signal;
   a D/A converter coupled to said computer for converting said simulated reflected signal to analog format; and
   a projector coupled to said D/A converter for receiving said simulated reflected signal in analog format and for converting said simulated reflected signal in analog format to a simulated reflected acoustic signal.

9. The target simulation system of claim 8 wherein said signal processing system further includes:
   a signal detector coupled between said hydrophone and said A/D converter for detecting said analog electrical test signal and excluding other signals from detection; and
   a power amplifier coupled between said projector and said D/A converter for amplifying said simulated reflected signal in analog format.

10. The method of claim 9 wherein the steps are repeated using a different target strength value.

11. The target simulation system of claim 8 wherein said computer includes a digital buffer for buffering said simulated reflected signal.

12. A method of generating a target simulation signal, said method comprising:

said method comprising:
transmitting an acoustic test signal underwater;
receiving said acoustic test signal and converting said acoustic test signal to an analog electrical test signal;
digitizing said analog electrical test signal to produce a digital test signal;
modifying said digital test signal to form a simulated reflected signal emulating said acoustic test signal reflected from a target having a known target strength, said step of modifying said digit test signal including:
converting said digital test signal into a series of ASCII numbers;
receiving a target strength value;
adding said target strength value to each of said ASCII numbers representing said digital test signal to produce an ASCII representation of said simulated reflected signal; and
converting said ASCII representation of said simulated reflected signal to a binary representation of said simulated reflected signal;
converting said simulated reflected signal to analog format;
transmitting said simulated reflected signal in analog format underwater; and
receiving said simulated reflected signal in analog format underwater.

13. The method of claim 12 buffering said simulated reflected signal in a digital buffer prior to converting said simulated reflected signal to analog format.

14. The method of claim 12 wherein receiving said acoustic test signal includes detecting said acoustic test signal and excluding other signals from detection.

15. The method of claim 12 wherein transmitting said simulated reflected signal includes amplifying said simulated reflected signal.

16. The method of claim 12 wherein the step of modifying said digital test signal includes weighting said digital test signal with a target strength value.

\* \* \* \* \*